F. N. HALLETT.
MOVING PICTURE CAMERA.
APPLICATION FILED APR. 20, 1920.

1,363,249.

Patented Dec. 28, 1920.
2 SHEETS—SHEET 1.

Inventor
F. N. Hallett
by Fred P. Gorin
his Atty.

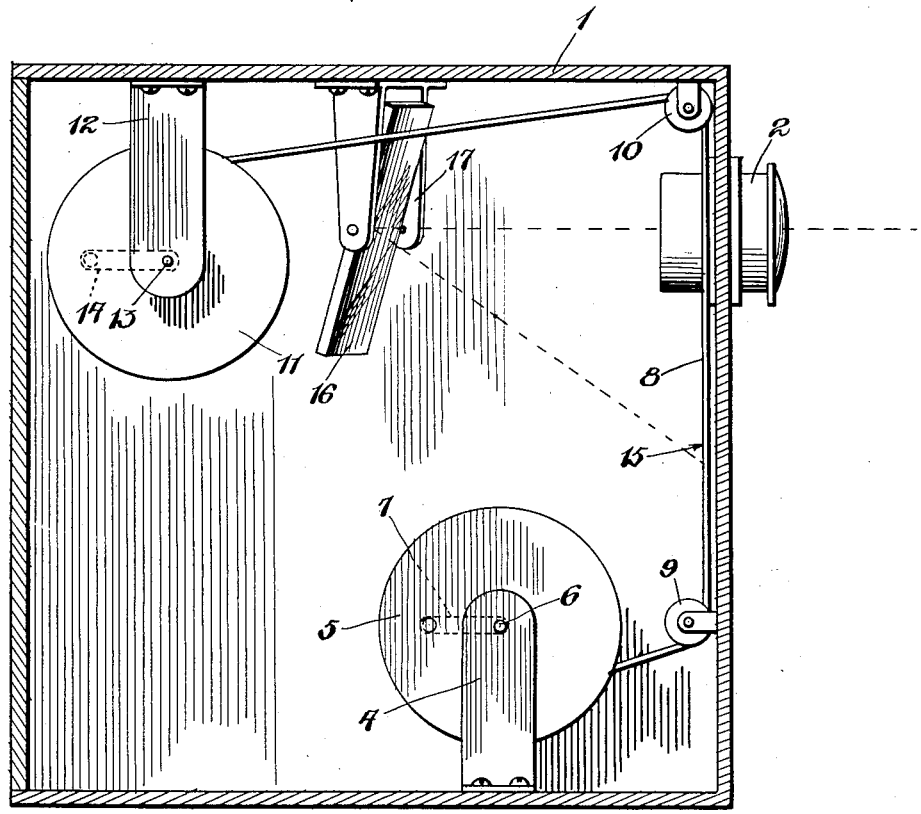

UNITED STATES PATENT OFFICE.

FRED N. HALLETT, OF SEATTLE, WASHINGTON.

MOVING-PICTURE CAMERA.

1,363,249.   Specification of Letters Patent.   Patented Dec. 28, 1920.

Application filed April 20, 1920. Serial No. 375,286.

*To all whom it may concern:*

Be it known that I, FRED N. HALLETT, a citizen of the United States, residing at Seattle, in the county of King and State of Washington, have invented certain new and useful Improvements in Moving - Picture Cameras, of which the following is a specification.

This invention relates to improvements in moving picture cameras.

An object of the invention is to provide a camera that will take pictures having a stereoscopic effect similar to that produced in the human eye.

Another object of the invention is the provision of two lenses, the light from which is reflected on the film at a single point, the rays from each lens coöperating to produce the desired effect.

The invention also comprehends improvements in the details of construction and operation which will be hereinafter more particularly pointed out.

In the drawings:

Fig. 2 is a vertical sectional view.

Figure 1:
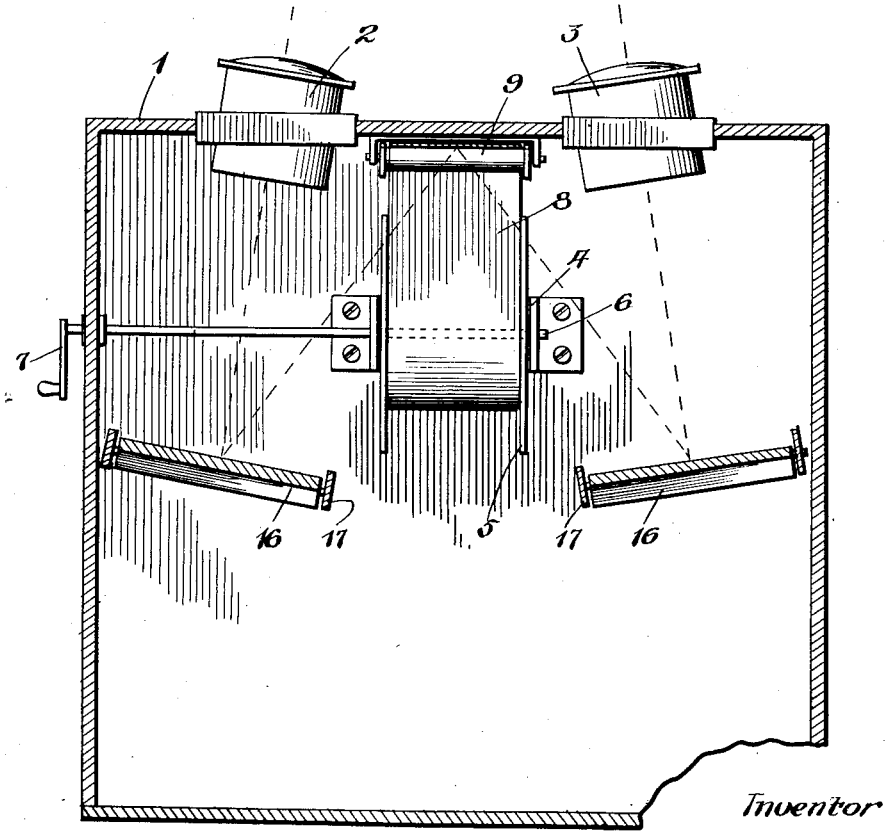
Figure 1 is a sectional plan of the camera.

In carrying out the desired objects a camera casing 1 is provided with lenses 2 and 3, spaced apart, so that the images observed through them will correspond to the images formed in each of the human eyes.

A frame 4 is mounted in the bottom portion of casing 1, and rotatably supports the film reel 5, on its shaft 6, provided with a handle 7 for rotating the reel. This reel 5 carries the negative film 8, which is led from the reel 5 over idler rollers 9 and 10, mounted in the casing; the film then being wound on the reel 11, rotatably mounted in a frame 12, on a shaft 13 provided with handle 14 for rotating this reel. The frame 12 is mounted to the upper portion of the casing as shown. The portion 15, of the film 8 is always kept in a position parallel with the front of the casing.

Mirrors 16, are adjustably mounted in brackets 17, to the top of the casing 1, each being adapted to reflect the light from one of the lenses onto the portion 15 of the film 8.

In use, a reel 5 carrying the film 8 is placed in the frame 4, the end of the film being passed around rollers 9 and 10 and wound on reel 11. After the film has been started on reel 11, the lenses are focused on the object to be pictured and the mirrors should be previously adjusted so the image from both lenses will be focused at one point on the film as indicated in the drawings by the dotted lines. It is obviously necessary that in order to complete the structure described to form a complete operative moving picture camera, an intermittent feed for the film and a shutter for periodically exposing the film are required; but as any well-known type of intermittent feed and shutter may be used and as no claim is made to this structure the same has been omitted from the drawings and only sufficient structure shown to enable applicant's invention to be clearly set forth. A moving picture of an object is taken by operating the parts to cause the film to move and be intermittently exposed as is common in this class of machines. The images of both lenses are to be exposed to the film at the same instant to produce the desired effect.

An object viewed by both human eyes does not appear the same to either eye, as they observe the object from different angles, but the images of the two eyes combined give us the sense of solidity, substance and distance, that is produce a stereoscopic effect.

By means of the two lenses and the mirrors, the images passing through each lense is reflected on the single film and combined, as in the human eye, to produce the same stereoscopic effect.

What I claim is:

An apparatus for taking stereoscopic motion pictures, comprising a casing, a pair of lenses mounted therein and spaced apart, a pair of mirrors, one mounted in the line of vision behind each lens and adjustable for reversing the direction of the rays of light from an object, said mirrors being at an angle with the line of vision for reflecting the rays of each lens toward each other and to a point below the horizontal plane of the mirrors and lenses, and a movable film having an image receiving portion vertically disposed between the lenses, and in the plane thereof, whereby the point of intersection of the two images is in the plane of the vertical portion of the film and on the rear side thereof and the mirrors may be positioned at a point equal to one-half the focal length of the lens.

In testimony whereof I affix my signature in the presence of two witnesses.

FRED N. HALLETT.

Witnesses:
OSCAR J. HANSON,
CLOYD E. BURNS.